April 8, 1941.  C. B. CLARK  2,238,012
CONTACT SULPHURIC ACID PROCESS
Filed March 16, 1939
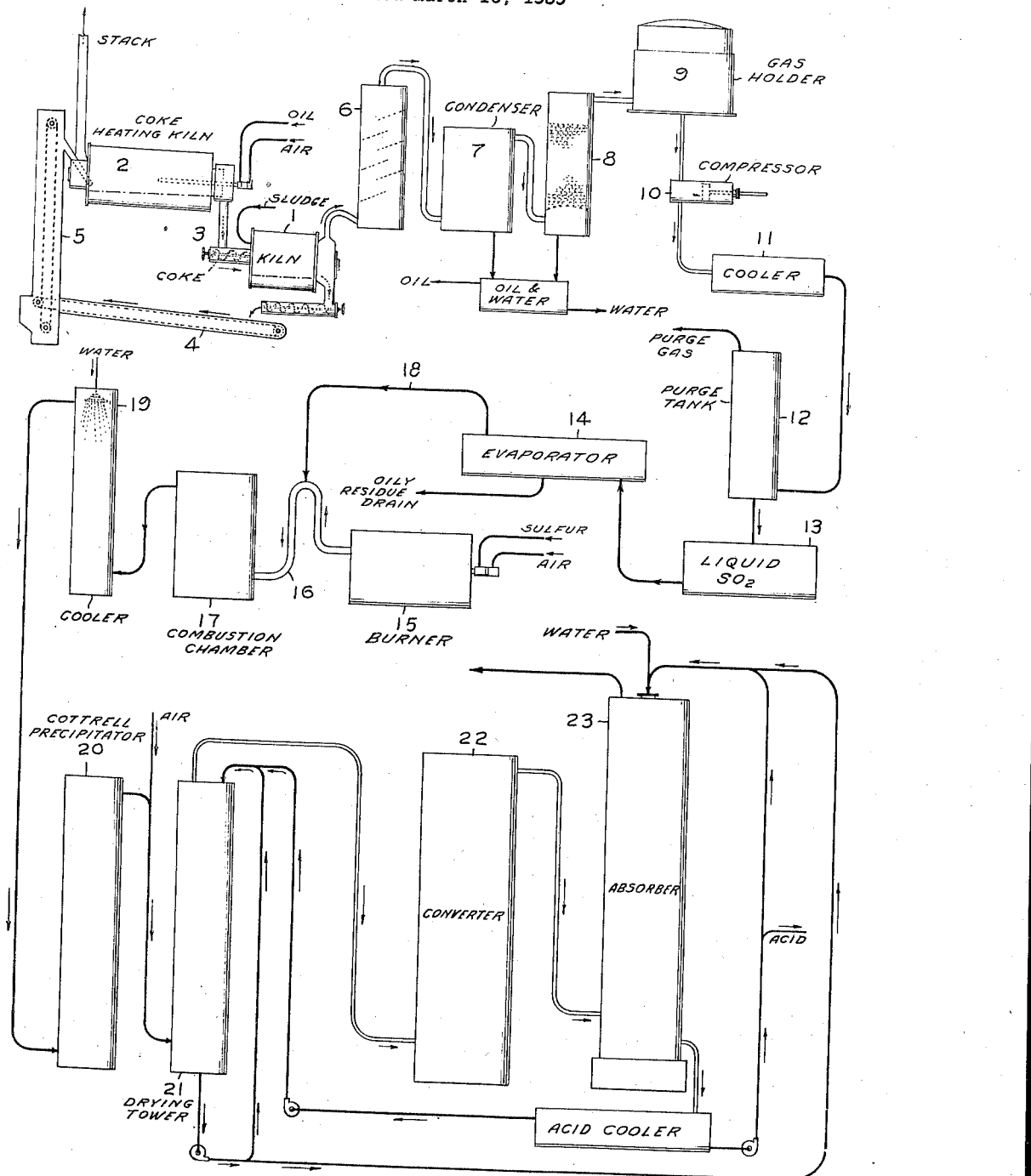
INVENTOR.
CYRIL B. CLARK,
BY Walter M. O'Brien
ATTORNEY.

Patented Apr. 8, 1941

2,238,012

UNITED STATES PATENT OFFICE 2,238,012

CONTACT SULPHURIC ACID PROCESS

Cyril B. Clark, Scarsdale, N. Y., assignor to American Cyanamid Company, New York, N. Y., a corporation of Maine Application March 16, 1939, Serial No. 262,090

2 Claims. (Cl. 23—175)

This invention relates to the production of sulphuric acid from acid sludges containing hydrocarbons and in particular from acid sludge produced in the sulphuric acid purification of petroleum hydrocarbons.

In recent years the problem of disposal of acid sludge from petroleum refineries has been successfully solved by processes involving the thermal decomposition of the acid sludge to produce a sulphur dioxide gas, purification of the gas, and oxidation of the sulphur dioxide to sulphur trioxide in a contact sulphuric acid process.

The gas produced by the thermal decomposition of acid sludge contains in addition the sulphur dioxide, water and hydrocarbons. The gas has therefore been subjected to a cooling operation to remove water and hydrocarbons, which operation however does not remove all the hydrocarbons but only those condensible at the temperature employed. The uncondensed hydrocarbons pass out of the condenser along with the $SO_2$ gas and must be removed by a further purification process before the gas is passed over the catalyst in the contact sulphuric acid plant. The amounts of uncondensible hydrocarbons in the gas will of course vary with the percentage of hydrocarbons originally contained in the acid sludge. Excessive amounts of hydrocarbons in the reaction gas mixture going to the contact converter will produce acid mist in the exit pipe from the converter due to the oxidation of the hydrogen therein. A further disadvantage would result from the heat produced by the burning of the hydrocarbons on the catalyst which heat of combustion when added to the heat of reaction derived from the oxidation of sulphur dioxide to sulphur trioxide would result in an unbalancing of the thermal conditions in the converter.

My invention is concerned with the removal of the hydrocarbon impurities of an acid sludge-sulphur dioxide gas to an extent which is at least sufficient to render the gas suitable for catalytic oxidation of the $SO_2$ in a contact sulphuric acid plant whereby the above described objectionable disadvantages are avoided. Briefly my invention consists in a series of purification steps performed in sequence on the impure gas whereby a sulphur dioxide gas is ultimately obtained which has all or substantially all of the hydrocarbon impurities removed therefrom. By purifying the gas in accordance with the process of my invention not only are the hydrocarbon impurities removed but a gas is produced which has a higher sulphur dioxide content than that of sulphur dioxide gases freed of hydrocarbons by other methods. This advantageous factor of higher sulphur dioxide concentration flows from the fact that in my process liquefaction of the $SO_2$ is employed. Not only does liquefaction result in a removal of hydrocarbons but in addition a further removal of hydrocarbons is effected by volatilization of the liquid sulphur dioxide in preparation for a final combustion step wherein residual hydrocarbons are burned out by means of a combustion supporting gas containing sulphur dioxide and oxygen. This combustion supporting gas is produced by burning a sulphur-bearing material, such as elemental sulphur, with only sufficient air to effect the combustion of the sulphur together with that necessary for the subsequent burning of the hydrocarbon impurities from the volatilized liquid sulphur dioxide. In this way the amount of diluting nitrogen introduced into the gas which is to be passed to the catalyst in the contact plant is reduced as compared with that present when all of the hydrocarbons remaining in the sludge gas coming from the condenser are burned in the presence of a sulphur-bearing material undergoing combustion with air.

It has heretofore been proposed to purify acid sludge-sulphur dioxide gases for removal of the hydrocarbon impurities by first condensing out water and hydrocarbons therefrom and then drying the gas as by sulphuric acid and compressing the dried gas to liquefy the same. The liquefied sulphur dioxide and its liquefied hydrocarbons are passed into a storage tank where it is claimed that by stratification the liquid hydrocarbons will constitute the upper layer and the liquid sulphur dioxide the lower layer. Such a process is described in British Patent No. 364,103. Decantation of the liquid hydrocarbons is depended upon for separation of them from the liquid sulphur dioxide. However, the liquid sulphur dioxide is known to be a solvent for hydrocarbons and it is open to question if not impossible for one to operate in this way to effectively remove hydrocarbon impurities from the sulphur dioxide especially where the tolerance of hydrocarbons in the reaction gas mixture for the contact sulphuric acid process is quite low. By inspection of this prior art process it will be seen that the separation of the liquid hydrocarbons from the liquid sulphur dioxide at their interface would be a problem in and of itself.

A further advantage to be had in the purifying of acid sludge-sulphur dioxide in accordance with the process of my invention is in the decreased water requirements. In processes wherein the sludge-sulphur dioxide is absorbed in water and hydrocarbons removed therefrom with subsequent stripping of the solution for the recovery of the SO₂ gas considerable amounts of water are required whereas by employing liquefaction in the purification of the gas the only water requirement is that used for initial cooling of the gas, for cooling of the compressor and for the liquefaction of the compressed gas, and for wet purification of the hot gas from the combustion of the residual hydrocarbon. The process in accordance with my invention is therefore of particular advantage where the cost of water is relatively high and electric power is available at low rates.

In the accompanying drawing and in the single figure thereof there is illustrated one form of apparatus suitable for the practice of the process of my invention.

Purification of sulphur dioxide gases containing hydrocarbon impurities in accordance with my invention will be described with reference to a sulphur dioxide gas produced by the thermal decomposition of a petroleum acid sludge with a hot solid, such as hot coke, as is more fully described in the patent to F. J. Bartholomew No. 2,028,713.

Acid sludge is fed into the rotating sludge decomposing kiln 1 and is thermally decomposed therein by means of hot coke. The coke used in the decomposition of the acid sludge is heated in a kiln 2 and by suitable conveying means is introduced into the sludge kiln. From the sludge kiln coke is removed to a conveyer 4 and by means of elevator 5 is returned to the heating kiln 2. The average temperature of the coke entering the sludge kiln may be about 1400° F. and the ratio of hot coke to sludge fed in kiln 1 about 3 parts to 1. The gas evolved from the sludge in kiln 1 is passed to baffle tower 6 wherein solid particles such as coke dust are removed from the gas. The gas then enters a condenser 7, which may be a water-cooled coil through which the gas flows, wherein condensible hydrocarbons and water are removed by the cooling of the gas and from which condensate is withdrawn as shown. The gas from this operation is passed upwardly through a tower 8 packed with spiral or Raschig rings for further removal of condensate therefrom, whereupon the gas enters a gas holder 9.

From the holder 9 the sulphur dioxide gas containing uncondensed hydrocarbons and any liquid hydrocarbons not removed by its passage through the packed tower 8 is passed to the compressor 10. In this compressor a pressure is applied to the gas sufficient to effect liquefaction of the sulphur dioxide in the cooler 11. In the cooler 11 not only is the sulphur dioxide liquefied but also those hydrocarbons which have the same vapor pressure as the sulphur dioxide. Consequently the liquid sulphur dioxide is contaminated with hydrocarbons having the same vapor tension as the liquid SO₂. The liquid and gas are then passed to a purge tank 12 wherein the gas containing uncondensed hydrocarbons is purged from the liquid. The purged gas will contain any nitrogen and oxygen together with the uncondensed hydrocarbons. The liquid sulphur dioxide from the purging step is passed to a receptacle 13. The original SO₂ gas has at this point been freed of only part of its hydrocarbon impurities.

A further hydrocarbon removal is effected by evaporating liquid sulphur dioxide away from the hydrocarbons dissolved therein in an evaporator 14, the vaporized sulphur dioxide passing to the final hydrocarbon removal step. In evaporating the sulphur dioxide some hydrocarbons may also be vaporized and pass off therewith, but in all cases an oily residue is left. The amount of this oily residue will depend on the quantity of low boiling hydrocarbons present originally in the sulphur dioxide and may amount to .5 to 1.5% of the liquid sulphur dioxide. The gas issuing from the evaporator 14 may contain from 88 to 95% SO₂ and from 5-12% hydrocarbon gas, the latter figure depending of course upon the amount of hydrocarbons originally present in the sulphur dioxide. Such a gas diluted down to the normal percentage of SO₂ for contact converter operation (7–8% SO₂) still contains too much hydrocarbon to pass directly to the converter. Accordingly a further purification of the sulphur dioxide from hydrocarbons is necessary.

The vaporized sulphur dioxide containing the gasified hydrocarbons is therefor subjected to a further purification step which consists in burning out all or substantially all of the remaining hydrocarbons. This is accomplished by mixing the gas with a hot combustion supporting gas produced by burning a sulphur-bearing material such as elemental sulphur with a small excess of air. By limiting the amount of air in the combustion stage the amount of diluting nitrogen in the gas going to the contact converter is reduced over that present in processes wherein the hydrocarbons in the sulphur dioxide are burned directly after the gas has been subjected to the initial cooling and condensing step. The combustion of the sulphur with air may be carried out in any suitable burner as indicated generally at 15, and the hot burner gas therefrom passes through the pipe 16 on its way to the combustion chamber 17. The evaporated sulphur dioxide containing the gasified hydrocarbons is preferably introduced into this pipe by line 18. The vaporized sulphur dioxide may however be introduced into the hot burner gas in any other suitable manner so long as the two gases are intermixed and combustion of the hydrocarbons takes place. This combustion of the hydrocarbons by means of the heat and oxygen of the burner gas proceeds to completion in the combustion chamber 17.

All the hydrocarbons may be burned from the sulphur dioxide or the hydrocarbon impurities may be eliminated to the extent that the hydrogen of the remaining hydrocarbons does not substantially exceed 2½ to 3 mg. per cubic foot of gas passed to the catalyst in the contact sulphuric acid plant, and the amount of water formed by burning these hydrocarbons in the converter does not exceed from 23 to 28 mg. per cubic foot of converter gas, as is more fully set forth in the patent to C. B. Clark No. 2,019,893.

The hot sulphur dioxide gas from the combustion chamber 17 is then subjected to a wet purification process in which by passage of the gas through a cooling tower 19 in contact with a spray of cooling water it is cooled and humidified, wherefrom it passes through a Cottrell precipitator 20 for removal of acid mist. Sufficient air is then mixed with the gas to provide the proper oxygen and sulphur dioxide content for the catalytic conversion of the sulphur dioxide to sulphur trioxide in the contact process. The sulphur dioxide air mixture is then dried with sulphuric acid in drying tower 21 whereupon it is passed at reaction temperatures over a suitable catalyst, which may be either platinum or of the vanadium type, in a converter 22 and the sulphur trioxide therefrom absorbed in known manner in absorber 23. The converter may be of the internal or external heat exchange type. The drying tower, converter and absorber may be operated in the usual manner with circulation of sulphuric acid to and from the drying tower and absorber.

While the operation of my invention has been described with reference to a sulphur dioxide containing hydrocarbon impurities produced by the decomposition of petroleum acid sludge in accordance with the Bartholomew process, it is not intended that my purification process is to be limited thereto since it may also be applied to sulphur dioxide gas obtained by the decomposition of petroleum acid sludge in accordance with other processes such as that described in Hechenbleikner Patent No. 1,953,225 wherein the sludge is decomposed by heating with hot combustion gases. It is of course applicable to any sulphur dioxide gas derived from the decomposition of acid sludge by any process wherein the sulphur dioxide is contaminated with hydrocarbon impurities. The invention is also applicable to sulphur dioxde gases obtaned by the thermal decomposition of coal tar sludges containing sulphuric acid wherein the sulphur dioxide is contaminated by hydrocarbons.

It is to be understood that the particular embodiment of my invention described above is given primarily by way of illustration and not by way of limitation of my invention, the scope of which is defined in the appended claims.

What I claim is:

1. The process of producing sulphuric acid which comprises thermally decomposing acid sludge to produce a gas containing sulphur dioxide, water and both condensible and uncondensible hydrocarbons, separating the condensable hydrocarbons and water from the gas by condensation, liquefying the sulphur dioxide and also hydrocarbons having the same vapor pressure, purging the uncondensed gas from the liquefied mixture, evaporating the liquefied mixture, a hydrocarbon residue being left, burning hydrocarbons out of the vaporized mixture to at least the extent that the resulting gas is suitable for use in the contact sulphuric acid process by mixing the vaporized mixture with a sufficient amount of a hot combustion supporting gas, subjecting the resulting gas to a wet purification process, adjusting the oxygen and sulphur dioxide content of the gas to that suitable for the catalytic oxidation of the sulphur dioxide to sulphur trioxide, drying the gas, and passing it at reaction temperatures over a catalyst in a contact sulphuric acid system.

2. The process of producing sulphuric acid which comprises thermally decomposing acid sludge to produce a gas containing sulphur dioxide, water and condensible and uncondensible hydrocarbons, separating condensable hydrocarbons and water from the gas by condensation, liquefying the sulphur dioxide and also hydrocarbons having the same vapor pressure, purging the uncondensed gas from the liquefied mixture, evaporating the liquefied mixture, a hydrocarbon residue being left, burning hydrocarbons out of the vaporized mixture to at least the extent that the resulting gas is suitable for use in the contact sulphuric acid process by mixing the vaporized mixture with a sufficient amount of hot combustion supporting gas containing sulphur dioxide, subjecting the resulting gas to a wet purification process, adjusting the oxygen and sulphur dioxide content of the gas to that suitable for the catalytic oxidation of the sulphur dioxide to sulphur trioxide, drying the gas, and passing it at reaction temperatures over a catalyst in a contact sulphuric acid system.

CYRIL B. CLARK.